US012432218B1

(12) United States Patent
Arutyunov et al.

(10) Patent No.: US 12,432,218 B1
(45) Date of Patent: Sep. 30, 2025

(54) ZERO-TRUST CYBERSECURITY ENFORCEMENT IN OPERATIONAL TECHNOLOGY SYSTEMS

(71) Applicant: Xage Security, Inc., Palo Alto, CA (US)

(72) Inventors: Roman Arutyunov, San Jose, CA (US); Vishal Gupta, Newark, CA (US); Ganesh Jampani, Gilroy, CA (US); Bao Ngo, San Jose, CA (US)

(73) Assignee: Xage Security, Inc., Palo Alto, CA (US)

( * ) Notice: Subject to any disclaimer, the term of this patent is extended or adjusted under 35 U.S.C. 154(b) by 294 days.

(21) Appl. No.: 18/301,387

(22) Filed: Apr. 17, 2023

(51) Int. Cl.
*H04L 9/40* (2022.01)
*H04L 41/22* (2022.01)

(52) U.S. Cl.
CPC ........ *H04L 63/105* (2013.01); *H04L 63/0838* (2013.01); *H04L 63/102* (2013.01)

(58) Field of Classification Search
CPC .. H04L 63/105; H04L 63/0838; H04L 63/102
(Continued)

(56) References Cited

U.S. PATENT DOCUMENTS 11,694,774 B1 *   7/2023   Nasrallah ............... G06N 20/00
                                                 705/3
11,770,398 B1 *   9/2023   Erlingsson .......... G06F 16/3329
                                                 709/224

(Continued)

FOREIGN PATENT DOCUMENTS

CN   106664292 A   5/2017
CN   115987644 A   4/2023
(Continued)

OTHER PUBLICATIONS

Vishal Gupta, "How Multi-Layer MFA Can Secure Critical Infrastructure", Sep. 20, 2022, <https://xage.com/blog/how-multi-layer-mfa-can-secure-critical-infrastructure/>, 4 pages.
(Continued)

*Primary Examiner* — Haresh N Patel
(74) *Attorney, Agent, or Firm* — Baker Botts L.L.P.

(57) ABSTRACT

In one embodiment, a method may implement a multi-layer cybersecurity model for a multi-layer distributed computer system which comprises a sensitive data resource, such as a computing environment with an operational technology (OT) layer with multiple zones, an information technology (IT) layer, a DMZ, and a cloud layer. The method can assess a policy based on a zero-trust model for the sensitive data resource. The method can receive one or more requests, at any layer of a multi-layer distributed computing system, to access the sensitive data resource and acquire identity information for a user account specified in the first request. The method can perform a multi-layer multi-factor authentication of the user account using the identity information and the multi-layer cybersecurity model. In response to authenticating the identity information, the method can acquire sensitive access data corresponding to the identity information. The method can determine a sensitive resource access value using the sensitive access data and the zero trust model. In response to determining the sensitive resource access value is above a predetermined threshold, the method can authenticate the user account.

20 Claims, 6 Drawing Sheets

(58) Field of Classification Search
USPC .......................................................... 726/4
See application file for complete search history.

(56) References Cited

U.S. PATENT DOCUMENTS

| | | | | |
|---|---|---|---|---|
| 11,792,284 B1* | 10/2023 | Nanduri | ................. | G06F 9/542 |
| | | | | 709/224 |
| 11,818,156 B1* | 11/2023 | Parikh | ................. | G06F 16/9537 |
| 11,973,784 B1* | 4/2024 | Erlingsson | ............ | G06F 9/5077 |
| 11,991,198 B1* | 5/2024 | Kapoor | ............... | G06F 16/9038 |
| 12,058,160 B1* | 8/2024 | Erlingsson | ............ | G06F 16/906 |
| 12,095,794 B1* | 9/2024 | Karaje | ................. | H04L 67/306 |
| 12,095,796 B1* | 9/2024 | Godefroid | ............... | G06F 9/542 |
| 12,130,878 B1* | 10/2024 | Nanduri | ................. | H04L 63/10 |
| 2022/0232024 A1* | 7/2022 | Kapoor | ................. | G06F 21/57 |
| 2022/0232025 A1* | 7/2022 | Kapoor | ............... | H04L 63/1425 |
| 2022/0247769 A1* | 8/2022 | Erlingsson | ............ | G06F 9/5072 |
| 2022/0311794 A1* | 9/2022 | Maya | ................. | G06F 11/0766 |
| 2022/0329616 A1* | 10/2022 | O'Hearn | ................. | G06F 9/545 |
| 2023/0032686 A1* | 2/2023 | Williams | ............ | G06F 16/9535 |
| 2023/0075355 A1* | 3/2023 | Twigg | ................. | H04L 67/306 |
| 2023/0126355 A1* | 4/2023 | Anani | ................. | H04L 63/0807 |
| | | | | 726/27 |
| 2023/0195863 A1* | 6/2023 | Xu | ................. | H04L 63/107 |
| | | | | 726/22 |
| 2023/0254330 A1* | 8/2023 | Singh | ................. | G06F 11/323 |
| | | | | 726/23 |
| 2023/0328086 A1* | 10/2023 | Kapoor | ............... | H04L 63/1425 |
| 2023/0388271 A1* | 11/2023 | Chen | ................. | H04L 63/102 |
| 2024/0064063 A1* | 2/2024 | Hall | ................. | H04L 41/16 |
| 2024/0106846 A1* | 3/2024 | Kapoor | ................. | H04L 63/10 |
| 2024/0154967 A1* | 5/2024 | McGuinness | ....... | H04L 63/0815 |
| 2024/0250960 A1* | 7/2024 | Danino | ............... | H04L 63/1416 |

FOREIGN PATENT DOCUMENTS

| | | |
|---|---|---|
| CN | 116011568 A | 4/2023 |
| CN | 116094848 A | 5/2023 |
| WO | 2015171580 A1 | 11/2015 |

OTHER PUBLICATIONS

Wikipedia, "Purdue Enterprise Reference Architecture," retrieved Jun. 26, 2023, <https://en.wikipedia.org/wiki/Purdue_Enterprise_Reference_Architecture>, Wikimedia Foundation, Inc., 3 pages.

* cited by examiner

ZERO-TRUST CYBERSECURITY ENFORCEMENT IN OPERATIONAL TECHNOLOGY SYSTEMS

TECHNICAL FIELD

One technical field of the present disclosure is computer-implemented security control, based on a zero-trust cybersecurity model, for multi-layer computer network topologies that include operational technology and/or industrial control systems. Another technical field is software-implemented cybersecurity and threat analysis for multi-layer computer network topologies.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Software systems are particularly susceptible to data exfiltration, identity theft, and fraud whereby a malicious entity gains access to protected data and assets. Cybersecurity infrastructure is critical for identifying, tracing, and analyzing each critical component or service that is incorporated into various systems. These problems can be acute in certain high-risk systems, such as transportation systems, supply chain operations, energy systems, water supply operations, and utilities.

Operational technology (OT) and industrial control systems (ICS) environments frequently lack built-in security controls, connect using multiple networks, and require remote access to physical assets via internetworking connections that are coupled to the public internet. Successful infiltration can result in shutdowns, reputational harm, environmental damage, and even loss of lives. Securing modern software systems in these environments is a formidable task, largely because a cybersecurity software application must assess all cybersecurity threats in all stages of the software supply chain.

Other operational requirements can complicate security screening. For example, some enterprises need to create multiple user identities for the same human user across multiple Active Directory (AD) servers or domains to grant the user access to different security zones and corresponding information technology (IT) assets or OT assets or devices within an IT network and an OT network. The existence of multiple user identities adds management complexity; for example, when the human user changes status, such as by leaving the enterprise or due to the expiration of a contract, then each user identity of that user must be deleted from a corresponding AD. The result can be stale accounts that continue to exist in the Ads long after the user has departed.

The Purdue model, part of the Purdue Enterprise Reference Architecture (PERA), was designed as a reference model for data flows in computer-integrated manufacturing (CIM), where a plant's processes are completely automated. It came to define the standard for building an ICS network architecture in a way that supports OT security, separating the layers of the network to maintain a hierarchical flow of data between them. The model shows how the typical elements of an ICS architecture interconnect, dividing them into six zones that contain information technology (IT) and OT systems. In the Purdue Model, communications are designed to transit zones upward or downward one zone at a time, and not across multiple zones. Implemented correctly, it helps establish an "air gap" between ICS/OT and IT systems, isolating them so an organization can enforce effective access controls without hindering business. Yet new approaches are needed to cope with all possible attack vectors for these environments as managing a multi-layer architecture using existing devices such as firewalls and jump boxes is excessively complex; consequently, many security holes typically are opened using firewalls across various layers, static accounts exist on jump boxes, and administrators define zones too broadly due to the complexity involved in managing interactions with many zones.

SUMMARY

The appended claims may serve as a summary of the invention.

DETAILED DESCRIPTION

Figure 1:
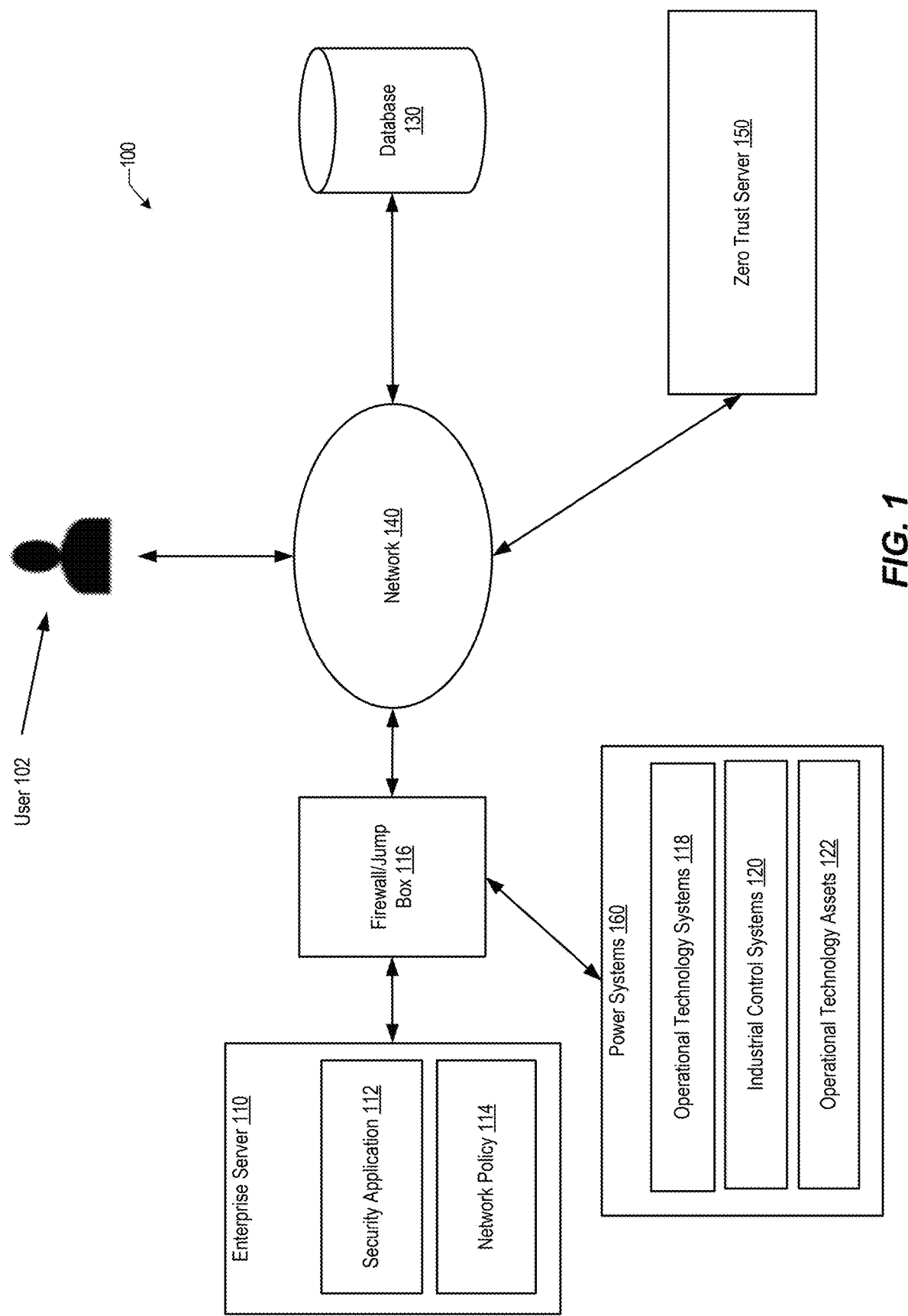
FIG. 1 shows a distributed computer system using a zero-trust server in accordance with an example embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

One or more different inventions may be described in this disclosure, with alternative embodiments to illustrate examples. Other embodiments may be utilized and structural, logical, software, electrical, and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more of the inventions nor a listing of features of one or more of the inventions that must be present in all embodiments.

Headings of sections and the title are provided for convenience but are not intended as limiting the disclosure in any way or as a basis for interpreting the claims. Devices that are described as in communication with each other need not be in continuous communication with each other unless expressly specified otherwise. In addition, devices that are in communication with each other may communicate directly or indirectly through one or more intermediaries, logical or physical.

A description of an embodiment with several components in communication with one other does not imply that all such components are required. Optional components may be described to illustrate a variety of possible embodiments and to illustrate one or more aspects of the inventions more fully. Similarly, although process steps, method steps, algorithms, or the like may be described in sequential order, such processes, methods, and algorithms may generally be configured to work in different orders, unless specifically stated to the contrary. Any sequence or order of steps described in this disclosure is not a required sequence or order. The steps of described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment, but need not occur only once. Some steps may be omitted In an embodiment or some occurrences, or some steps may be executed more than once in a given embodiment or occurrence. When a single device or article is described, more than one device or article may be used in place of a single device or article. Where more than one device or article is described, a single device or article may be used in place of more than one device or article.

The functionality or features of a device may be alternatively embodied by one or more other devices that are not explicitly described as having such functionality or features. Thus, other embodiments of one or more of the inventions need not include the device itself. Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

Embodiments are described in the sections below according to the following outline:
1. GENERAL OVERVIEW
2. STRUCTURAL AND FUNCTIONAL OVERVIEW
   2.1 CYBERSECURITY SYSTEM EXAMPLE
   2.2 EXAMPLE ZERO TRUST SERVER
3. PROCEDURAL OVERVIEW
4. IMPLEMENTATION EXAMPLE
5. HARDWARE OVERVIEW 1. General Overview Cybersecurity leaders have begun to rely on zero-trust models to design and implement secure critical operational technology and industrial control systems. The inventors have discovered, in an inventive moment, that improved security can be achieved by supplementing a cybersecurity architecture to combine a zero-trust model with additional layers of protection.

The zero-trust model is one of the most secure and reliable ways to protect critical assets, such as systems, networks, devices, applications, and data, from a malicious entity. The zero-trust model operates based on zero implicit trust in programmatic or electronic requests that a first system transmits to a second, protected system. All components of the computing infrastructure are untrusted, including both private enterprise networks and external public networks, and subject to programmatic controls that are configured for restricting and controlling the access of a user, user account, or requests initiated from user computers toward protected data or assets. Further, no user account, software, or devices within the computing environment are trusted by default, even if they are connected to a permissioned network, such as a private enterprise network, or external public networks, and even if they were previously verified. The zero-trust model is implemented by establishing strong identity verification, validating device compliance prior to granting access and granting least-privilege access to explicitly authorized resources only unless broader access is explicitly determined to be necessary. Thus, the zero-trust model can effectively prevent a malicious entity from gaining access to protected data or assets. Likewise, the zero trust model can effectively prevent the malicious entity from making lateral movements in the cybersecurity architecture, such as from an endpoint device to another endpoint device or a server, due to the granular segmentation of resources in the environment.

In an embodiment, a computer-implemented method is programmed to implement multi-layer cybersecurity using zero trust in relation to a plurality of operational technology systems of a computing environment. In an embodiment, the method is programmed to apply a defense-in-depth strategy with a plurality of protection layers to enhance zero-trust security. For example, in a multi-layer network topology consisting of at least an IT network layer and an OT layer, optionally having multiple zones, and optionally having a cloud layer logically above the IT network layer, when a user account attempts to access any of a plurality of operational technology systems of the protected environment, a method is programmed to generate in real-time a policy to grant access to a sensitive data resource based on verified identities and, typically, to require authentication or re-authentication of a request, user account, or user whenever the request, user account, or user traverses the topology to a different layer. Examples of sensitive data resources can include protected programs, endpoints, servers, data, assets, devices, and/or systems needed for tasks.

In contrast, a traditional cybersecurity model, such as a castle-and-moat model, usually uses firewalls and jump boxes to define a network perimeter so that elements inside the network perimeter can access data on the inside and no elements outside the network perimeter can access data on the inside. However, the traditional cybersecurity model cannot efficiently solve security problems for remote workplaces or in-cloud environments that require internet access to sensitive, valuable, or critical industrial equipment. However, in an embodiment, the method is programmed to constantly verify all identities, devices, and services against cybersecurity threats for movements within the plurality of operational technology systems of a protected environment.

In an embodiment, the method is programmed to repeatedly check user account credentials, as programmatic requests traverse the protected topology, to prevent malicious actors from accessing a sensitive data resource. Throughout this disclosure, checks of users or accounts apply to applications, machines, devices, or account data. In an embodiment, the method is programmed to perform authentication of a request or user account every time that a request arrives and/or the user account attempts to access a sensitive data resource. For example, identities of a user account or request are independently reconfirmed or authenticated when a request crosses a layer or a zone boundary and the request cannot proceed in the new layer or zone unless authentication is successful in that layer. An authentication node and/or directory server can be called to conduct authentication. In an embodiment, the method is programmed to eliminate all unnecessary interactions with the sensitive data resource. In an embodiment, the method is programmed to allow only authorized user accounts and applications to receive access to the sensitive data resource.

Embodiments encompass the subject matter of the following numbered clauses:

1. A computer-implemented method comprising: installing a control program in each functional element of a protected distributed computer system that is organized in a plurality of logical layers or zones, one or more of the logical layers or zones hosting one or more sensitive data resources associated with an operational technology or information technology; receiving a first request from a user computer to access a first sensitive data resource of a first layer or zone from among the plurality of logical layers or zones; assessing a policy associated with the first sensitive data resource, the policy being based on a zero-trust model; acquiring identity information for a user account specified in the first request; performing a multi-layer multi-factor authentication of the user account using the identity information of the user account and the multi-layer cybersecurity model; in response to authenticating the identity information, obtaining sensitive access data corresponding to the identity information and determining a sensitive resource access value using a zero trust approach which is applied to authenticate the user account using the sensitive access data and the zero trust model; in response to determining the sensitive resource access value is above a predetermined threshold, authenticating the user account; in response to receiving one or more second requests to access a second sensitive data resource of any of the plurality of logical layers or zones, repeating the receiving, the assessing, the acquiring, the performing, the obtaining, the determining, and the authentication.

2. The method of clause 1, further comprising, in response to rejecting the identity information, rejecting or blocking the user account.

3. The method of clause 1, further comprising, in response to determining the sensitive resource access value is below a predetermined threshold, rejecting or blocking the user account.

4. The method of clause 1, wherein the multi-layer cybersecurity model comprises a defense-in-depth strategy that is applied to a plurality of protection layers.

5. The method of clause 1, further comprising receiving a second request when the user accesses a projection layer of the multi-layer cybersecurity model in operational technology and control systems environments for the organization.

6. The method of clause 1, wherein the identity information of the user account comprises a one-time password that is time-bound, scheduled, and short-lived.

7. The method of clause 1, wherein the first sensitive data resource comprises sensitive information associated with account information, personal information, or software code.

8. The method of clause 7, wherein the sensitive information is a text, an image, a video, or a directory of a file system.

9. The method of clause 1, wherein the identity information of the user account comprises biometric features, and the sensitive access data corresponding to the identity information is determined from prior experience of the user account in the organization.

2. Structural and Functional Overview 2.1 Distributed Computer System Example

FIG. 1 illustrates a distributed computer system showing the context of use and principal functional elements with which one embodiment could be implemented. In an embodiment, a computer system 100 comprises components that are implemented in an informational technology (IT) network at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of assessing a zero-trust server 150 in order to assess one or more security models to perform authentication for a user 102 when the user 102 attempts to access a particular sensitive data source. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

FIG. 1 shows a computer system 100 comprising an enterprise server 110 that is communicatively coupled via a firewall or jump box 116 to a network 140, a database 130 that is accessible via the network 140, a zero-trust server 150, and power systems 160, in accordance with one or more embodiments. In various embodiments, the components and arrangement of computer system 100 can vary; while FIG. 1 shows one configuration of components, other configurations may be used without departing from the scope of the disclosure. For example, multiple components in FIG. 1 may be combined to create a single component. As another example, the functionality performed by a single component may be performed by two or more components or multiple instances of certain components can be provided. For example, when the zero-trust server 150 is implemented using a Xage Fabric node from Xage Security, Inc., many Xage Fabric nodes each acting as a point of authentication and authorization can be deployed in various layers or zones, alone or with Xage Enforcement Points (XEPs). Additionally or alternatively, one or more Active Directory (AD) nodes, AD servers, or other directory servers or authentication servers can provide authentication services within a particular layer or zone.

The label "power systems 160" is used as an example to represent power generation assets such as turbines and related control systems, as well as protected systems unrelated to power, such as utility systems, transportation systems, logistics systems, or government systems, as a few examples.

In the example of FIG. 1, the computer system 100 is configured for performing authentication for a user computer, user account, client computer, or other computing device or technical element that requests access to the system generally or to the power systems 160. For simplicity, the designation "user 102" refers to a user computer, user account, client computer, or other computing device or technical element that requests access to the system, but the label "user" refers exclusively to technical elements that interact programmatically or electronically with other elements, and not individual persons.

Each of the enterprise server 110 and the zero-trust server 150 may be implemented using any one or more of a server computer, desktop computer, and/or one or more virtual computing instances in one or more private data centers and/or public data centers or cloud computing environments. Each of the enterprise server 110 and the zero-trust server 150 can be programmed to communicate with other functional elements using TCP/IP as well as application-layer protocols such as parameterized HTTP or to communicate programmatically via API calls, RPC, or other programmatic messaging with the enterprise server 110.

Network 140 broadly represents any wireline or wireless network, using any form of electronic digital communication link including satellite or terrestrial network links, such as cloud, local area networks (LANs), metropolitan area networks (MANs), wide area networks (WANs), campus network, internetworks, or combinations thereof. The Network 140 may include or comprise the public internet and networked server computers that implement Web2 and/or Web3 technologies. Network 140 may comprise or support intranets, extranets, or virtual private networks (VPNs).

In an embodiment, the enterprise server 110 may implement network security features using multiple programs, sets of executable instructions, programmatic services, or other functional elements, such as security application 112 and network policy 114, to secure power systems 160 against cyber-attacks. For example, security application 112 can implement virus scanning techniques, and the network policy 114 may include specific programmatic rules for the security application 112, and firewall and jump box 116 that identify what IP addresses, ports, requests, or messages are allowed and/or disallowed for communicating with and controlling the power systems 160. As further described, embodiments offer effective alternatives to the use of VPN technologies, so enterprise server 110 does not need to provide a VPN client for user 102. As another example, network policy 114 may implement one or more industrial asset protocols, such as distributed network protocol 3 (DNP3), Modbus, Profibus, LonWorks, and digital addressable lighting interface (DALI). The enterprise server 110 can read and execute admission or blocking operations on network traffic to implement network policy 114 to reduce complexity and increase compatibility with various traditional protocols, such as transmission control protocol/internet protocol (TCP/IP).

In an embodiment, power systems 160 broadly represents one or more computing devices, network infrastructure, IoT elements, or electromechanical devices of operational technology (OT) systems 118, industrial control systems (ICS) 120, and operational technology assets 122. The operational technology systems 118 can include one or more networks to monitor and control different operational technology assets 122 of the power systems 160, and those networks can be regarded as critical infrastructure subject to protective measures enforced by the zero-trust server 150. Power systems 160 can comprise large-scale, distributed systems, and consequently, the critical infrastructure can be a prime target for cyber-attacks from one or more malicious actors, especially when the critical architecture is exposed to IT zones where the cyber-attacks are located. For example, if the critical infrastructure is compromised, the cyber-attacks can cause infiltration, power shortages, and widespread disruption; infiltration can result in shutdowns, reputational harm, environmental damage, and even loss of lives.

In an embodiment, to protect power systems 160, computer system 100 implements network security using multiple functional elements at multiple different logical layers, such as security application 112, network policy 114, and firewall/jump box 116, to block or limit access to resources or data that are physically or logically outside or behind the firewall/jump box 116. For example, all digital network traffic of the user 102, or any other computing device attempting to access the power systems 160, is routed through the firewall/jump box 116 to access the power systems. As another example, the firewall/jump box 116 may include a blocking or filtering program for protecting data in power systems 160.

In an embodiment, the industrial control systems 120 may include one or more hardware-based electronic control systems, such as Programmable Logic Controllers (PLCs), remote sensors, servos, pumps, and/or control valves. In an embodiment, the industrial control systems 120 can have sizes ranging from modular panel-mounted controllers to large interconnected and interactive distributed controlled systems to assess business operational data, IT operational data, or combinations thereof, such as transaction invoices, performance indicators, capacity, temperature, pressure, and flow, at multiple setpoints. The enterprise server 110 can be programmed to control and monitor various components, such as PLCs, personal devices, remote sensors, and control valves, of the industrial control systems 120 including but not limited to control commands to prevent hazardous conditions in the systems.

2.2 Example Zero Trust Server

The zero-trust server 150 is programmed to enforce one or more security models concerning the treatment of network traffic directed toward the enterprise server 110 and/or power systems 160, such as a multi-layer cybersecurity model, a zero trust model, a multi-factor authentication (MFA) model, and a defense-in-depth model. Program instructions and policy data to define the security models can be stored in database 130 and zero-trust server 150 can use a programmed database interface to retrieve the instructions and data for evaluation or use. The zero-trust server 150 can be programmed to enforce the zero-trust model on the results or actions of one or more other existing security systems. For example, the system can reflect or define individual perimeters for each site, asset, device, or data stream of the power systems 160. Additionally or alternatively, the zero-trust server 150 can enforce a security overlay using one or more of identity and access management (IAM), privileged access management (PAM), zero-trust network access (ZTNA), segmentation, and local redundancy with continuous operation. In this manner, the zero-trust server 150 is programmed to control interactions between physical assets, user computers, and connected tools to reduce a cyber-attack surface.

In an embodiment, the zero-trust server 150 is programmed to interact with functional elements of the operational technology systems 118 and the industrial control systems 120. The zero-trust server 150 can be programmed to authenticate and authorize access requests according to security policy 114 and/or using one or more security models. For example, the zero-trust server 150 can be programmed with data representing a normal pattern of user accounts, requests, computing devices, and controllers of each site, asset, device, or data stream in the operational technology systems 118 and industrial control systems 120. The zero-trust server 150 can be programmed to assess operational data collected from operational technology systems 118 and industrial control systems 120 and identify abnormal network traffic or patterns that may be associated with a security threat. In response, the zero-trust server 150 can be programmed to execute a plurality of operations security application 112, and firewall/jump box 116, including but not limited to: 1) layered authentication, including multi-layer multi-factor authentication, to minimize the risk of compromised identities; 2) layered protocol and session breaks to protect insecure protocols; 3) layered filtering to minimize unnecessary network traffic that can potentially limit the available bandwidth for critical operations; and 4) end-to-end message integrity and authenticity validation to protect against spoofing and injection.

Figure 2:
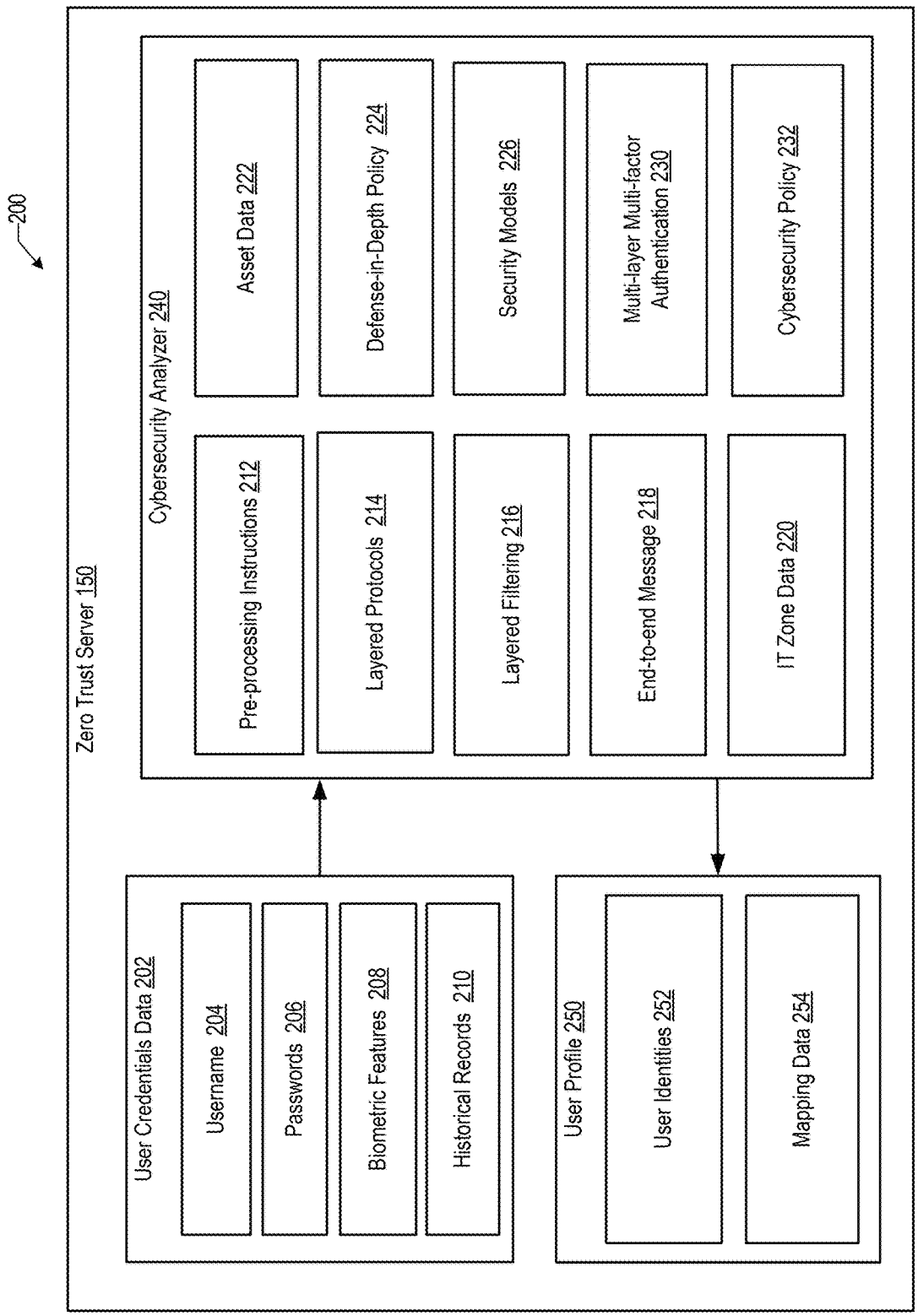
FIG. 2 illustrates an example of functional elements and data sources of a zero-trust server.

FIG. 2 illustrates an example 200 of functional elements and data sources of a zero-trust server. In an embodiment, the zero trust server 150 is programmed to perform user authentication and cyber-attack detection using a cybersecurity analyzer 240. Assume that a user 102 attempts to access a particular sensitive data source, such as asset data 222 using an electronic device via the enterprise server 110, the enterprise server can be programmed to transmit a request to the zero-trust server 150 to perform user authentication and cyber-attack detection using one or more security models 226. The electronic device may include a mobile phone, a tablet computer, or a laptop computer. The user 102 can use the electronic device to submit user credentials data 202, such as username 204, passwords 206, and/or biometric features 208. The user credential data 202 can also include a physical address, email address, phone number, documents, files, and media items. As another example, the electronic device can include one or more scanners to capture an image which can be used to extract biometric features 208 using facial recognition and fingerprint analysis. The biometric features 208 can include an eigenface and/or finger skin textures associated.

In an embodiment, the cybersecurity analyzer 240 may be programmed with pre-processing instructions 212 to execute multi-layer multi-factor authentication 230 to minimize the risk of compromised identities. The multi-layer multi-factor authentication 230 can be programmed to execute one or more of 1) authentication of username 204 and/or passwords 206 embedded in a token to uniquely identify a user; 2) features, such as biometric features 208, extracted from an image of the user; and 3) historical records 210 of network traffic or requests, such as historical authentication requests, location coordinates of electronic devices from which the historical authentication requests were made, timestamps of historical authentication requests. Furthermore, the multi-layer approach comprises re-confirming multi-factor authentication as user 102 requests access to more sensitive information in more sensitive locations; as further described, requests that transit layers or zones are automatically required to complete re-authentication in the new layer or zone before the requests are admitted.

The pre-processing instructions 212 can be programmed to verify the user 102 based on verifying the token which can encode a username, password, or other credentials. The pre-processing instructions 212 can be programmed to apply a face-matching algorithm to match a captured image to a stored image of the user 102 from the user profile in the database 130. The pre-processing instructions 212 can be programmed to calculate a mathematical distance between the user's biometric features 208 derived from the captured image associated with the user 102 and biometric features previously stored in the database 130. Examples of suitable mathematical distance algorithms include Euclidean distance, cosine similarity, overlap similarity, and Pearson similarity. The pre-processing instructions 212 can be programmed to verify the user 102 when the mathematical distance is below a predetermined threshold. In another example, the pre-processing instructions 212 can be programmed to perform a fingerprint analysis based on different fingerprint patterns, such as accidental, radial loop, ulnar loop, double loop, central pocket loop, plain arch, tented arch, and plain whorl, to determine a graphical match between a captured fingerprint associate with the user 102 and a previously stored fingerprint associated with the user 102 in the database 130. In response to determining a match, the pre-processing instructions 212 can be programmed to verify the user 102. In another example, the pre-processing instructions 212 can be programmed to verify user 102 based on verifying historical records 210 previously made by user 102.

In an embodiment, the cybersecurity analyzer 240 may be programmed to assess one or more security models 226 based on one or more sensitive data resources. The cybersecurity analyzer 240 can be programmed to implement a defense-in-depth policy 224 using a plurality of layers of protection under one or more security models 226 using a series of security mechanisms and controls, such as layered protocols 214 and cybersecurity policy 232. The goal of the defense-in-depth policy 224 is to stop cyber-attacks before the cyber-attacks happen in order to protect the particular sensitive data source, such as asset data 222. For example, if a layer of protection is compromised by a security breach due to security vulnerabilities inherent with hardware, software, and/or employees associated with the computer system 100, additional layers of protection can act as a backup to ensure that cyber threats from one or more malicious actors can be detected and stopped along the way. Thus, the cybersecurity analyzer 240 can be programmed to apply a combination of layered protocols 214 and cybersecurity policy 232 to protect a plurality of IT zones data 220 which include an organization's endpoints, data, applications, and networks.

The cybersecurity analyzer 240 can be programmed using the defense-in-depth policy 224 to effectively detect anomalies in the behavior of hardware, software, and/or employees associated with the computer system 100 for early detection of cyber-attacks from one or more malicious actors. As another example, the cybersecurity analyzer 240 can be programmed to apply the defense-in-depth policy 224 for one or more security models 226 to protect the particular sensitive data source, such as asset data 222, when the user 102 requests to access the particular sensitive data source: 1) the cybersecurity analyzer 240 can be programmed to verify a username 204 and passwords 206 of the user 102; 2) the cybersecurity analyzer 240 can be programmed to verify biometric features 208 of the user 102 extracted from videos and/or images captured by one or more security cameras of an electronic device; 3) the cybersecurity analyzer 240 can be programmed to verify historical records 210 of the user 102.

The cybersecurity analyzer 240 can be programmed to use the layered protocols 214 for prescribing security applications needed for the interpretability of anomalies in the behavior of hardware, software, and/or employees associated with the computer system 100, as well as standards for information needed to reason about safe deployment. For example, the layered protocols 214 may include one or more rules for communication associated with safety, firewall, jump box, and encryption. The cybersecurity analyzer 240 can be programmed to apply the layered protocols 214 in a plurality of communication applications, such as email, instant messaging, and voice over internet protocol (VOIP) against any breach, attack, or incident that may occur. In another example, the layered protocols 214 may help to divide the computer system 100 into a plurality of layers for improved flexibility and interoperability. A layer of projection in the computer system 100 can be replaced with an upgraded layer of protection. Therefore, the cybersecurity analyzer 240 can be programmed to apply the layered protocols 214 to protect insecure protocols associated with the computer system 100.

In an embodiment, the cybersecurity analyzer 240 can be programmed to implement a zero-trust model combined with one or more security models 226. In an embodiment, the zero-trust model comprises a cybersecurity policy 232 to grant access to a sensitive data resource, such as asset data 222. The sensitive data resource can include sensitive information associated with account information, personal information, or software code. For example, sensitive information is text, an image, a video, or a directory. The cybersecurity analyzer 240 can be programmed to implement cybersecurity policy 232 to ensure system-level user safety across multiple components of the computer system 100. In particular, cybersecurity analyzer 240 can be programmed to use cybersecurity policy 232 continuously to detect cyber-attacks from one or more malicious actors from an endpoint device like user 102 attempting to access the sensitive data resource in a cloud-based application hosted by the computer system 100. For example, cybersecurity policy 232 can be programmed to include predetermined cybersecurity requirements and instructions for user authentication and detection of cyber-attacks in the computer system 100. The cybersecurity analyzer 240 can be programmed to apply cybersecurity policy 232 to determine whether to authenticate a user or request or reject them based on user credentials data 202. In another example, cybersecurity policy 232 can include a whitelist or blacklist of user accounts that are allowed or not allowed to access the particular sensitive data source. In another example, cybersecurity policy 232 can include a plurality of actions to authenticate a user to access a particular sensitive data source. Therefore, the cybersecurity analyzer 240 can be programmed to implement cybersecurity policy 232 to control access to the sensitive data source based on the predetermined cybersecurity requirements and instructions.

In an embodiment, the cybersecurity analyzer 240 can be programmed to overlay the zero trust model on top of one or more security models 226. Embodiments can create an integrated security system that includes individual perimeters around each site, asset, device, or data stream to provide reliable and secure digital asset access for the sensitive data source in the computer system 100. In particular, the cybersecurity analyzer 240 can be programmed to apply an overlay approach by incorporating various securing tools, such as identity and access management, privileged access management, zero-trust network access, and segmentation, as well as by enforcing local redundancy with continuous operation. The architecture can provide end-to-end message 218 integrity and authenticity validation to protect against spoofing and injection. Therefore, the cybersecurity analyzer 240 can be programmed to seamlessly control the interactions between physical assets, users, and connected tools to reduce cyber-attack surface. Furthermore, the cybersecurity analyzer 240 can be programmed to apply layered filtering 216 to provide access control at Layer 2 to Layer 7 of the OSI model; one benefit is minimizing unnecessary network traffic that can potentially limit the available bandwidth for critical operations. The layer filtering 216 can be programmed to reduce the allocation of computing and hardware resources, such as CPU, memory, PLCs, personal devices, remote sensors, and control valves, of the operational technology systems 118.

In an embodiment, the zero-trust server 150 may be programmed to receive a resource access request from user 102, and in response to acquiring identity information, such as user credentials data 202 in the sensitive data resource access request to perform a multi-layer multi-factor authentication using the identity information and the one or more security models 226. The identity information can comprise a username and one-time password for a remote access session which is time-bound, scheduled, and short-lived. In response to authenticating the identity information, such as user identities 252 in the user profile 250, for the user, the zero-trust server 150 can acquire pre-configured accessible sensitive data, such as mapping data 254, corresponding to the identity information for the user. The pre-configured accessible sensitive data corresponding to the identity information is determined from the prior experience of the user in the organization. The zero-trust server 150 can be programmed to determine a sensitive resource access value using a zero-trust approach which is applied to authenticate the user using the pre-configured accessible sensitive data and the zero-trust model. The zero-trust server 150 can be programmed to determine the sensitive resource access value using the zero-trust approach based on the multi-dimensional Euclidean distance. When the sensitive resource access value is above a predetermined threshold, the zero-trust server 150 can be programmed to authenticate the user. Likewise, when the sensitive resource access value is below a predetermined threshold, the zero-trust server 150 can be programmed to reject the user. User and device trust is verified only when the user tries to connect to a server that includes one or more sensitive data sources. After a session is established, there is no further check done by the zero-trust server 150. In other words, once user 102 is allowed access to the server, the interactions between the user and the server are completely ignored by the zero-trust server 150.

3. Procedural Overview

Figure 3:
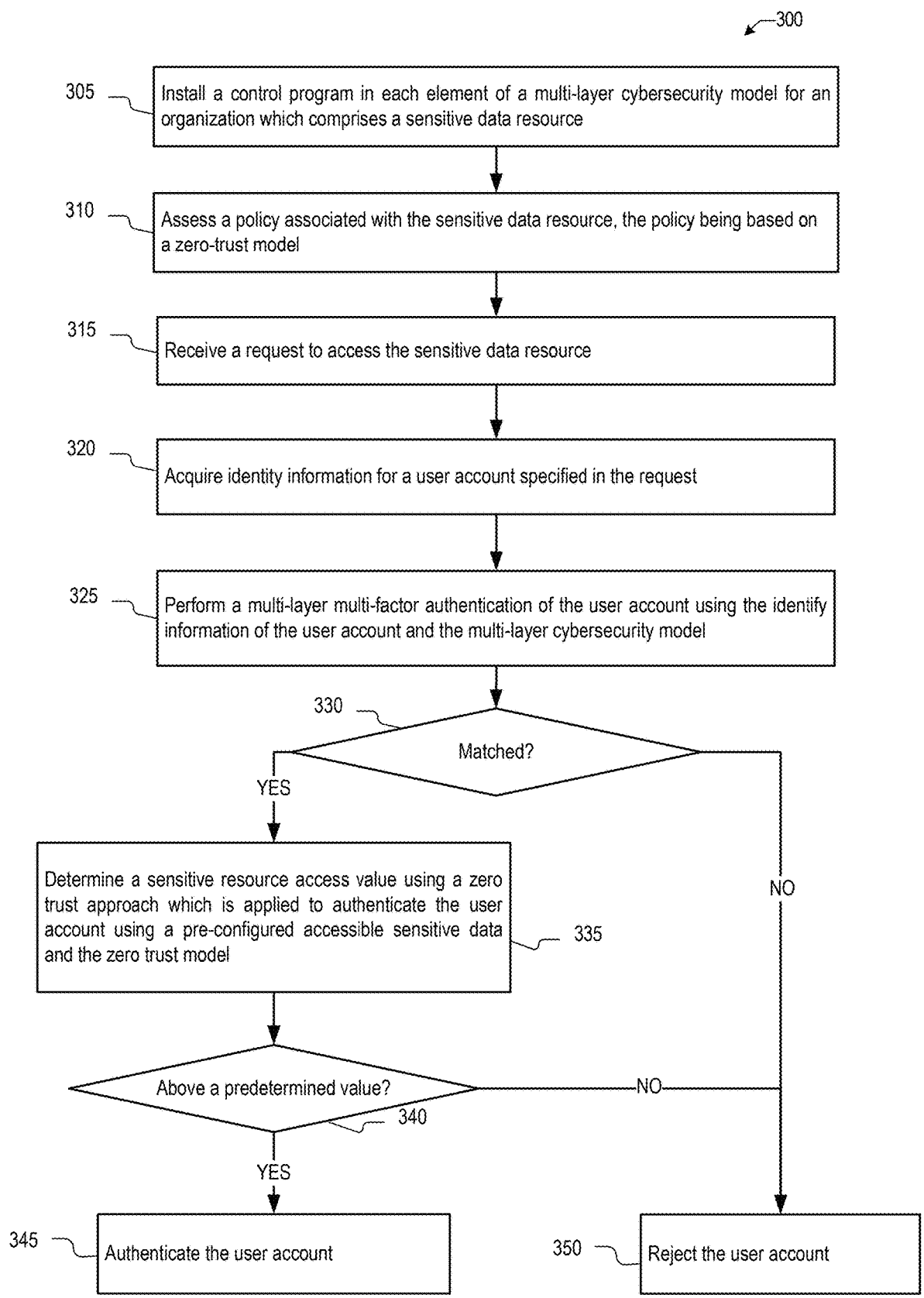
FIG. 3 shows a flow chart of a method of performing user authentication and threat detection using a zero trust model when a user attempts to access a sensitive data source in accordance with one or more embodiments.

FIG. 3 illustrates a method 300 of performing user authentication and threat detection using a zero-trust model when a user attempts to access a sensitive data source in accordance with one or more embodiments. FIG. 3 and each other flow diagram herein is intended as an illustration of the functional level at which skilled persons, in the art to which this disclosure pertains, communicate with one another to describe and implement algorithms using programming. The flow diagrams are not intended to illustrate every instruction, method object, or sub-step that would be needed to program every aspect of a working program, but are provided at the same functional level of illustration that is normally used at the high level of skill in this art to communicate the basis of developing working programs.

FIG. 3 can be programmed to apply a zero trust model to access the sensitive data source. One or more blocks in FIG. 3 may be performed by one or more components as described in FIG. 1 and FIG. 2; for example, the zero-trust server 150 can be programmed, using one or more sequences of instructions, to execute the operations of FIG. 3. While the various blocks in FIG. 3 are presented and described sequentially, some or all of the blocks may be executed in different orders, may be combined or omitted, and some or all of the blocks may be executed in parallel. Furthermore, the blocks may be performed actively or passively.

In block 305, a control program is installed in a protected system in each functional element which comprises a sensitive data resource. For example, the protected system can be a power system that comprises one or more power generation turbine assets. The zero-trust server 150 can be programmed to install a control program in each functional element of the protected system, the control program is programmed to implement a defense-in-depth strategy using a plurality of security layers to perform identity-based authentications, authorization, and granular access control. The control program can be programmed to execute 1) layered authentication, such as a multi-layer multi-factor authentication, to minimize the risk of compromised identities; 2) layered protocol and session breaks to protect insecure protocols; 3) layered filtering to minimize unnecessary network traffic that could potentially limit the available bandwidth for critical operations, and 4) end-to-end message integrity and authenticity validation to protect against spoofing and injection.

In block 310, the process is programmed to assess a policy associated with the sensitive data resource to determine whether a request can access the sensitive data source, based on zero trust in the requesting device, account, or user. In an embodiment, the zero-trust server 150 is programmed to access and assess the policy to independently reconfirm user, account, or device identities at each function element associated with a request crossing a logical layer or zone boundary of the protected system. For example, a policy to grant access to the sensitive data source can include instructions to determine whether to authenticate the request, user, account, or device or reject the request, user, account, or device based on user credentials data, such username, passwords, biometric features, and historical records. As another example, the policy to grant access to the sensitive data source can include a list of requests, users, accounts, or devices that are allowed to access the sensitive data source.

In block 315, a request is received to access the sensitive data resource in accordance with one or more embodiments. The request can be received at any functional element of a particular logical layer or zone of a multi-layer or multi-zone protected system, as further described herein in relation to FIG. 4A, FIG. 4B. When a request, user, account, or device attempts to access the sensitive data resource via the enterprise server 110, the enterprise server is programmed to transmit a request to the zero-trust server 150 to determine user credentials data 202 associated with the request, user, account, or device. Alternatively, a request, user, account, or device may attempt to access the enterprise server 110 via the zero-trust server 150, which will determine user credentials data 202 associated with the request, user, account, or device.

In block 320, the process is programmed to acquire identity information for a user account specified in the request. The identity information can be acquired and stored as user credentials data 202 in the user account associated with the user in the zero-trust server 150 when the zero-trust server receives the request to access the sensitive data source. For example, the user credentials data 202 can include username 204, passwords 206, biometric features 208, and other user identifiers, such as a physical address, email address, phone number, documents, files, and media items. In particular, the zero-trust server 150 can extract biometric features 208 of the user using one or more scanners to capture an image of the user.

In block 325, the process is programmed to execute a multi-layer multi-factor authentication of the user account using the identity information of the user account and the multi-layer cybersecurity model. The zero-trust server 150 can be programmed to communicate with an electronic device electrically or wirelessly, such as a mobile phone, a smartphone, or a smartwatch, to receive the user credentials data from the user account. For example, the electronic device can include a camera to obtain an image of the user. In particular, the zero-trust server 150 can be programmed to perform the multi-layer multi-factor authentication by utilizing one or more of 1) authentication of username 204 and/or password 206 embedded in a token to uniquely identify the user; 2) features, such as biometric features 208, extracted from an image of the user; and 3) historical records 210 of the user, such as historical authentication requests, location coordinates of electronic devices from which the historical authentication requests were made, timestamps of historical authentication requests. Calls to an AD server in the current layer, one or more Xage nodes, or a combination, can occur to process the authentication request and authenticate the request, user account, or user. As a result, the zero-trust server 150 can use multi-layer multi-factor authentication to verify the user by comparing the user credentials data to the user identities of a plurality of valid user profiles stored in the database of the enterprise server 110.

In block 330, the process is programmed to determine whether the identity information of the user matches a valid user profile in the database of the enterprise server 110. Where the identity information of the user matches a valid user profile in the database of the enterprise server 110, control transfers to block 335. Where the identity information of the user does not match any valid user profile in the database of the enterprise server 110, control transfers to block 350.

In block 335, a sensitive resource access value is determined using a zero-trust approach. The zero-trust server 150 can be programmed based on the zero-trust approach to authenticate the user account using pre-configured sensitive access data and the zero-trust model. In particular, the zero-trust server 150 can acquire the pre-configured sensitive access data, such as mapping data 254, corresponding to the identity information for the user account. For example, the zero-trust server 150 can determine a sensitive resource access value by calculating a mathematical distance based on the sensitive access data. When the mathematical distance is within an access circle grid, the zero-trust server 150 can determine the sensitive resource access value is above a predetermined threshold to allow the user account to access the sensitive data source. Likewise, when the mathematical distance is outside the access circle grid, the zero-trust server 150 can determine the sensitive resource access value is below a predetermined threshold to reject the user account to access the sensitive data source. In this situation, when the mathematical distance is within a cyber-attack circle grid, the zero-trust server 150 can determine the access operation from the user is a cyber-attack.

In block 340, the process is programmed to determine whether the sensitive resource access value is above a predetermined value in accordance with one or more embodiments. Where the sensitive resource access value is above the predetermined value, the process may proceed to block 345. Where the sensitive resource access value is below the predetermined value, the process may proceed to block 350. In block 345, the request or user account is authenticated in accordance with one or more embodiments. In block 350, the request or user account is rejected in accordance with one or more embodiments.

Figure 4A:
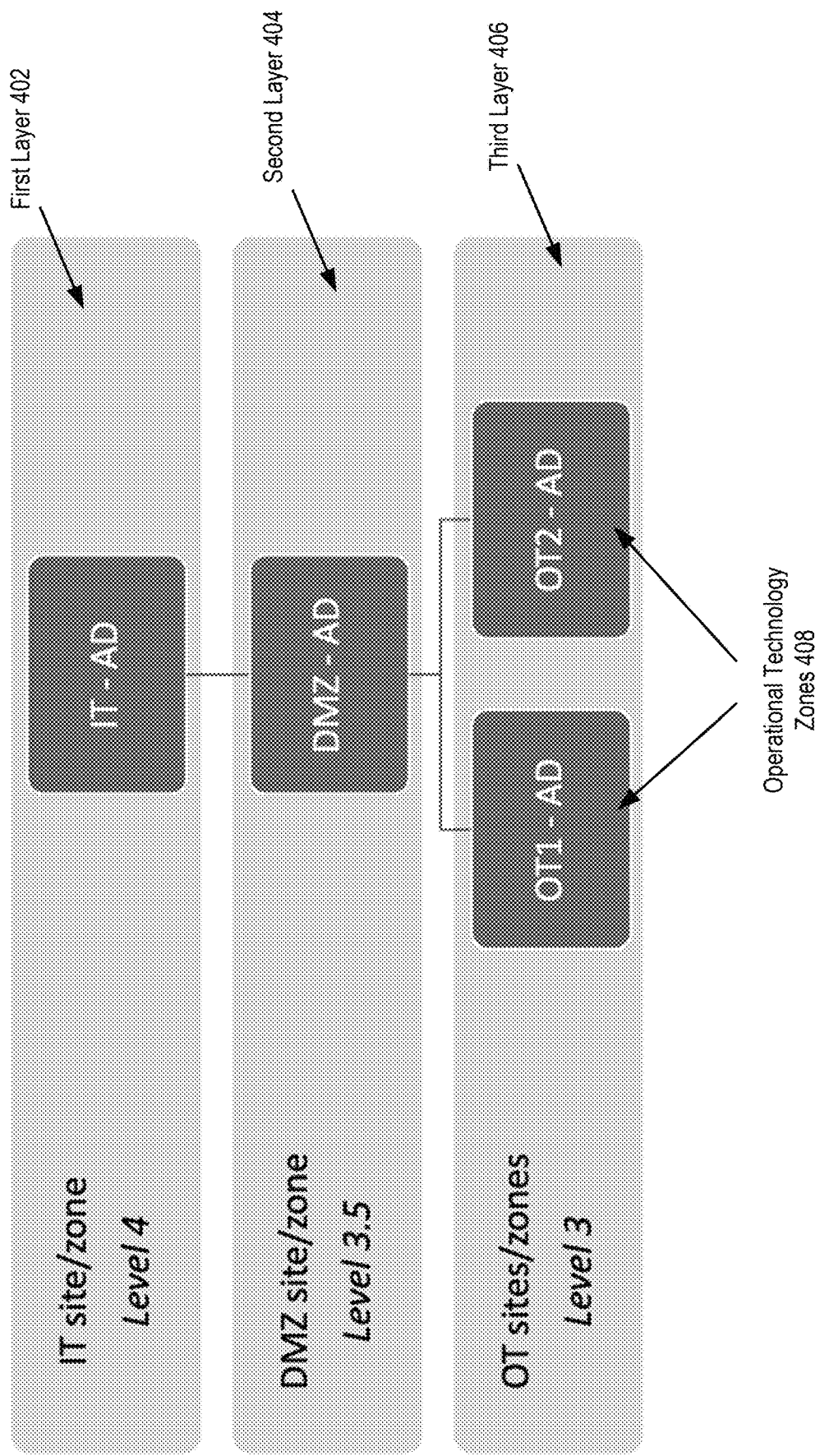
FIG. 4A shows an example of an operational technology topology in accordance with one example.
Figure 4B:
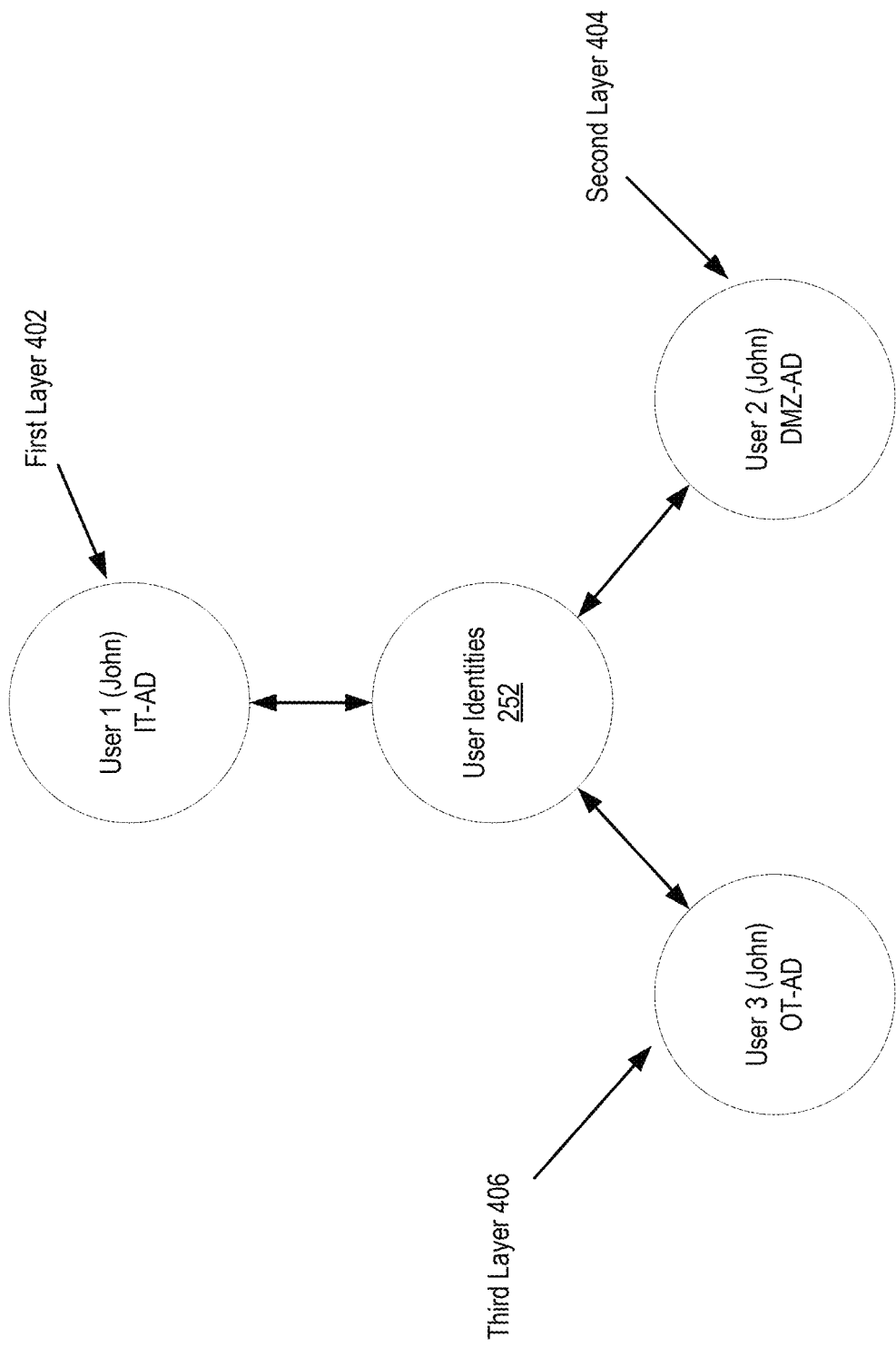
FIG. 4B shows an example of a user identity mapping in accordance with one or more embodiments.

In an embodiment, the control program installed at block 305, and the zero-trust server 150, are programmed to execute the operations of block 315 to block 350, inclusive, whenever a request is received at or crosses into, a functional element of any functional element of a particular logical layer or zone of a multi-layer or multi-zone protected system, as further described herein in relation to FIG. 4A, FIG. 4B.

4. Implementation Example

FIG. 4A shows an example of an operational technology topology in one embodiment. The enterprise server can use a multi-layer cybersecurity model to map different security zones to corresponding operational technology assets and/or devices within the operational technology network. For example, the zero-trust server 150 can map the corresponding operational technology assets and/or devices, such as mapping data 254, to different layers of defense in the multi-layer cybersecurity model, such as first layer 402, a second layer 404, and a third layer 406. The number of layers and zones shown in FIG. 4A represent only one example; in other embodiments, the third layer 406 can comprise many other layers and zones. Furthermore, the public internet, cloud computing centers or services, and/or one or more cloud computing instances, storage instances, and/or applications can be present in a cloud layer logically located at Layer 5 above the first layer 402.

Each layer of FIG. 4A can comprise one or more Active Directory (AD) servers and/or other directory servers that are configured or programmed to provide authentication services. An enterprise server 110 also can include one or more multiple AD servers to manage a plurality of operational technology assets and/or devices within the operational technology network. Each of the layers of defense can be mapped to one or more AD servers to mirror a typical operational technology network topology. In particular, the first layer 402 can be mapped to a plurality of first AD servers in an IT zone, the second layer 404 can be mapped to a plurality of second AD servers in a demilitarized zone (DMZ), and the third layer 406 can be mapped to a plurality of third AD servers in an operational technology zone. The operational technology network topology can be determined based on the configuration of the AD servers associated with the company. For example, the third layer 406 can include two groups of AD servers associated with different operational technology zones 408, such as PLCs, distributed control systems, computer control systems, energy monitoring systems, safety systems, and transportation systems.

In an embodiment, the control program installed at block 305, and the zero-trust server 150, are programmed to execute the operations of block 315 to block 350, inclusive, whenever a request is received at or crosses into a functional element of any functional element the first layer 402, the second layer 404, the third layer 406, or any of the zones 408 of the third layer. Furthermore, the control program installed at block 305, and the zero-trust server 150, are programmed to execute authentication operations for all user identities of a user, against one or more of the AD servers and/or Xage nodes. FIG. 4B shows an example of a user identity mapping in accordance with one or more embodiments. The zero-trust server 150 can use a multi-layer cybersecurity model to manage multiple user identities for the same user across multiple AD servers to grant that user access to different security zones and corresponding operational technology assets and/or devices within the operational technology network. For example, a user can have different user identities in different security zones, such as user 1 in the first layer 402, user 2 in the second layer 404, and user 3 in the third layer 406. The zero-trust server 150 can map these different user identities associated with the same user to user identities 252 in the multi-layer cybersecurity model based on user credential data associated with the user.

Embodiments programmed according to the foregoing process and architecture provide a distributed, multi-layer MFA system that can be effective to secure real-world operations. By combining a zero-trust access control model with a defense-in-depth authentication strategy, the disclosed solution provides multiple MFA deployment options and complements the Purdue model. Further, since users must reconfirm their identity to access each subsequent layer in a multi-layer protected system, the disclosed approaches can provide granular, independent user verification, down to even an individual operational site or a single OT asset. Consequently, the compromise of an individual authentication factor, such as during an MFA fatigue attack, does not allow a hacker to infiltrate further assets, systems, or applications.

Instead, the disclosed solution fingerprints every protected device and user across the network and allows a user access to only specific devices based on policy authorization. A remote access session can even be time-bound, scheduled, and short-lived, using a one-time password. Thus, if a hacker infiltrates one layer or an individual site, the hacker can be rapidly isolated and unable to access other systems.

5. Hardware Overview

According to one embodiment, the techniques described herein are implemented by at least one computing device.

The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
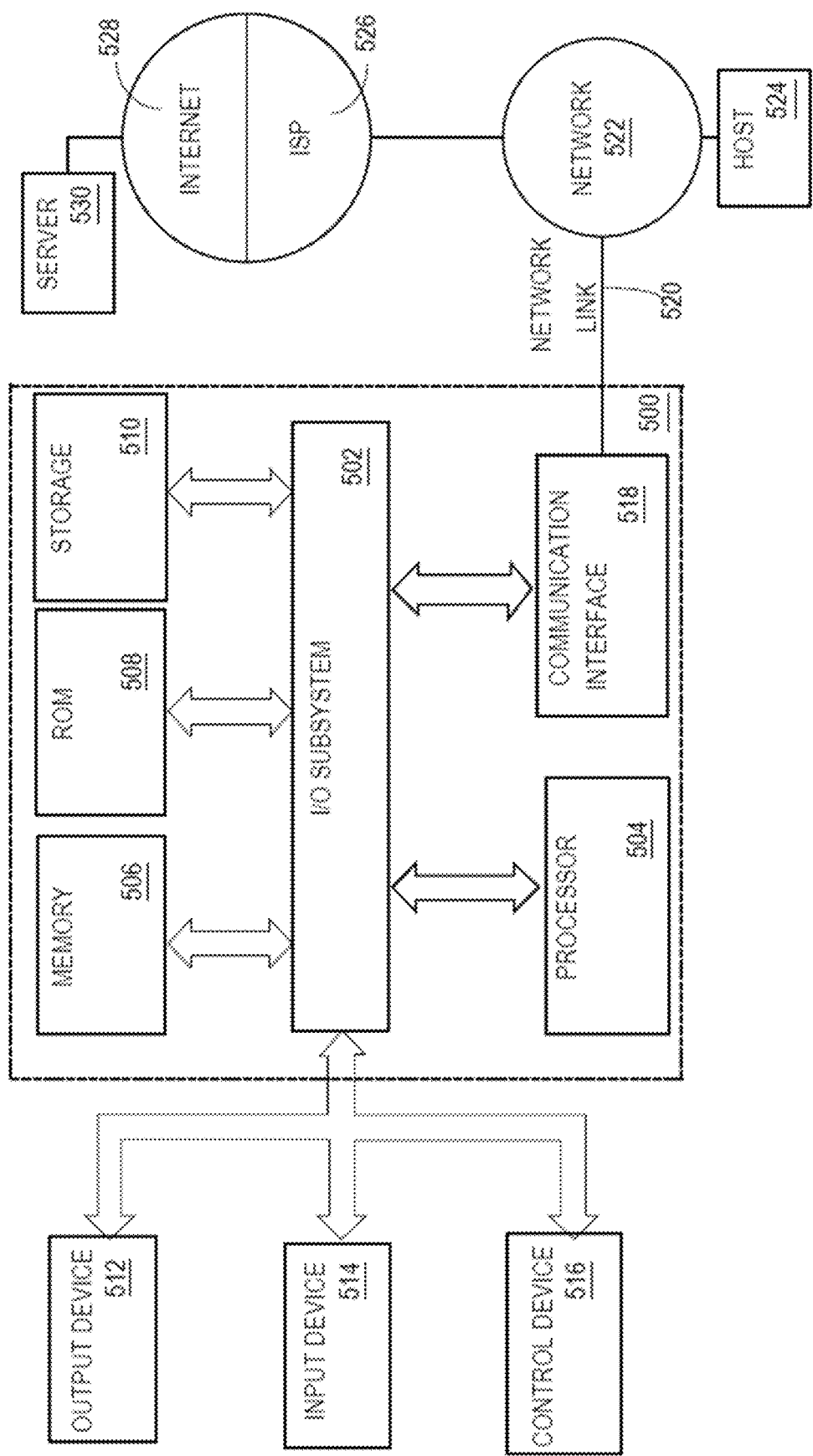
FIG. 5 illustrates a computer system in accordance with one or more embodiments.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller, and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU), or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during the execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read-only memory (ROM) 508 or other static storage devices coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, solid-state storage, magnetic disk, or optical disks such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508, or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer such as a relational database system using a structured query language (SQL) or no SQL, an object store, a graph database, a flat file system, or other data storage.

Computer system 500 may be coupled via I/O subsystem 502 to at least one output device 512. In one embodiment, output device 512 is a digital computer display. Examples of a display that may be used in various embodiments include a touchscreen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections, or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. The control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism, or another type of control device. An input device 514 may include a combination of multiple different input devices, such as a video camera and a depth sensor.

In another embodiment, computer system 500 may comprise an Internet of Things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders, and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware, and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware, and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire, and fiber optics, including the wires that comprise a bus of I/O subsystem 502. Transmission media can also take the form of acoustic or light waves, such as those generated during radio-wave and infrared data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as placing the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to a network link(s) 520 that are directly or indirectly connected to at least one communication network, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 522 broadly represents a local area network (LAN), wide-area network (WAN), campus network, inter-network, or any combination thereof. Communication interface 518 may comprise a LAN card to provide a data communication connection to a compatible LAN or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic, or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a worldwide packet data communication network represented as Internet 528. A server computer 530 may be coupled to Internet 528. Server 530 broadly represents any computer, data center, virtual machine, or virtual computing instance with or without a hypervisor or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, a server farm, or other organizations of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer, and data storage layer such as a relational database system using a structured query language (SQL) or no SQL, an object store, a graph database, a flat file system or other data storage.

Computer system 500 can send messages and receive data and instructions, including program code, through the network(s), network link 520, and communication interface 518. In the Internet example, server 530 might transmit a requested code for an application program through Internet 528, ISP 526, local network 522, and communication interface 518. The received code may be executed by processor 504 as it is received, and/or stored in storage 510, or other non-volatile storage for later execution.

The execution of instructions as described in this section may implement a process in the form of an instance of a computer program that is being executed, consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
installing a control program in each functional element of a protected distributed computer system that is organized in a plurality of logical layers or zones, one or more of the logical layers or zones hosting one or more sensitive data resources associated with an operational technology or information technology;
receiving a first request from a user computer to access a first sensitive data resource of a first layer or zone from among the plurality of logical layers or zones;
assessing a policy associated with the first sensitive data resource, the policy being based on a zero-trust model;
acquiring identity information for a user account specified in the first request;
performing a multi-layer multi-factor authentication of the user account using the identity information of the user account and a multi-layer cybersecurity model;
in response to authenticating the identity information, obtaining sensitive access data corresponding to the identity information and determining a sensitive resource access value using a zero trust approach which is applied to authenticate the user account using the sensitive access data and the zero trust model;
in response to determining the sensitive resource access value is above a predetermined threshold, authenticating the user account;
in response to receiving one or more second requests to access a second sensitive data resource of any of the plurality of logical layers or zones, repeating the receiving, the assessing, the acquiring, the performing, the obtaining, the determining, and the authentication.

2. The method of claim 1, further comprising, in response to rejecting the identity information, rejecting or blocking the user account.

3. The method of claim 1, further comprising, in response to determining the sensitive resource access value is below a predetermined threshold, rejecting or blocking the user account.

4. The method of claim 1, wherein the multi-layer cybersecurity model comprises a defense-in-depth strategy that is applied to a plurality of protection layers.

5. The method of claim 1, further comprising receiving a second request when the user accesses a projection layer of the multi-layer cybersecurity model in operational technology and control systems environments for the organization.

6. The method of claim 1, wherein the identity information of the user account comprises a one-time password that is time-bound, scheduled, and short-lived.

7. The method of claim 1, wherein the first sensitive data resource comprises sensitive information associated with account information, personal information, or software code.

8. The method of claim 7, wherein the sensitive information is a text, an image, a video, or a directory of a file system.

9. The method of claim 1, wherein the identity information of the user account comprises biometric features, and the sensitive access data corresponding to the identity information is determined from prior experience of the user account in the organization.

10. A computer system, comprising:
one or more processors; and
one or more computer-readable non-transitory storage media coupled to one or more of the processors and comprising instructions operable when executed by one or more of the processors to cause the system to execute:
installing a control program in each functional element of a protected distributed computer system that is organized in a plurality of logical layers or zones, one or more of the logical layers or zones hosting one or more sensitive data resources associated with an operational technology or information technology;
receiving a first request from a user computer to access a first sensitive data resource of a first layer or zone from among the plurality of logical layers or zones;
assessing a policy associated with the first sensitive data resource, the policy being based on a zero-trust model;
acquiring identity information for a user account specified in the first request;
performing a multi-layer multi-factor authentication of the user account using the identity information of the user account and a multi-layer cybersecurity model;
in response to authenticating the identity information, obtaining sensitive access data corresponding to the identity information and determining a sensitive resource access value using a zero trust approach which is applied to authenticate the user account using the sensitive access data and the zero trust model;
in response to determining the sensitive resource access value is above a predetermined threshold, authenticating the user account;
in response to receiving one or more second requests to access a second sensitive data resource of any of the plurality of logical layers or zones, repeating the receiving, the assessing, the acquiring, the performing, the obtaining, the determining, and the authentication.

11. The system of claim 10, wherein the instructions are further operable when executed by the one or more of the processors to cause the system to:
in response to rejecting the identity information, reject or block the user account; and
in response to determining the sensitive resource access value is below a predetermined threshold, reject or block the user account.

12. The system of claim 10, wherein the multi-layer cybersecurity model comprises a defense-in-depth strategy which is applied to a plurality of protection layers.

13. The system of claim 10, wherein the instructions are further operable when executed by the one or more of the processors to cause the system to receive a second request when the user computer accesses a projection layer of the multi-layer cybersecurity model in operational technology and control systems environments for the organization.

14. The system of claim 10, wherein the identity information of the user account comprises username and one-time password that is time-bound, scheduled, and short-lived.

15. The system of claim 10, wherein the sensitive data resource comprises sensitive information associated with account information, personal information, or software code.

16. The system of claim 15, wherein the sensitive information is a text, an image, a video, or a directory of a file system.

17. The system of claim 10, wherein the identity information of the user account comprises biometric features of the user, and the sensitive access data corresponding to the identity information is determined from prior experience of the user account in the organization.

18. One or more computer-readable non-transitory storage media storing one or more sequences of instructions which, when executed using one or more processors, cause the one or more processors to execute:
installing a control program in each functional element of a protected distributed computer system that is organized in a plurality of logical layers or zones, one or more of the logical layers or zones hosting one or more sensitive data resources associated with an operational technology or information technology;
receiving a first request from a user computer to access a first sensitive data resource of a first layer or zone from among the plurality of logical layers or zones;
assessing a policy associated with the first sensitive data resource, the policy being based on a zero-trust model;
acquiring identity information for a user account specified in the first request;
performing a multi-layer multi-factor authentication of the user account using the identity information of the user account and a multi-layer cybersecurity model;
in response to authenticating the identity information, obtaining sensitive access data corresponding to the identity information and determining a sensitive resource access value using a zero trust approach which is applied to authenticate the user account using the sensitive access data and the zero trust model;
in response to determining the sensitive resource access value is above a predetermined threshold, authenticating the user account;
in response to receiving one or more second requests to access a second sensitive data resource of any of the plurality of logical layers or zones, repeating the receiving, the assessing, the acquiring, the performing, the obtaining, the determining, and the authentication.

19. The one or more computer-readable non-transitory storage media of claim 18, further comprising sequences of instructions which when executed using the one or more processors cause the one or more processors to execute receiving a second request when the user accesses a projection layer of the multi-layer cybersecurity model in operational technology and control systems environments for the organization.

20. The one or more computer-readable non-transitory storage media of claim 18, wherein the identity information of the user account comprises username and a one-time password that is time-bound, scheduled, and short-lived.

\* \* \* \* \*